(12) United States Patent
Driessen

(10) Patent No.: US 7,636,695 B2
(45) Date of Patent: Dec. 22, 2009

(54) RETAIL POINT OF SALE (RPOS) APPARATUS FOR INTERNET MERCHANDISING

(76) Inventor: James Leonard Driessen, 305 N. 1130 E., Lindon, UT (US) 84042

( * ) Notice: Subject to any disclaimer, the term of this patent is extended or adjusted under 35 U.S.C. 154(b) by 397 days.

(21) Appl. No.: 11/262,855

(22) Filed: Oct. 31, 2005

(65) Prior Publication Data

US 2006/0053067 A1    Mar. 9, 2006

(51) Int. Cl.
*G06Q 20/00* (2006.01)
*G06Q 30/00* (2006.01)

(52) U.S. Cl. .............................. 705/64; 705/17; 705/26

(58) Field of Classification Search ................ 705/17, 705/26, 27, 64
See application file for complete search history.

(56) References Cited

U.S. PATENT DOCUMENTS

| | | | |
|---|---|---|---|
| 5,033,184 A | | 7/1991 | Tandai |
| 5,103,392 A | | 4/1992 | Mori |
| 5,339,239 A | | 8/1994 | Manabe |
| 5,530,751 A | | 6/1996 | Morris |
| 5,568,550 A | | 10/1996 | Ur |
| 5,629,770 A | | 5/1997 | Brassil |
| 5,699,427 A | | 12/1997 | Chow |
| 5,710,886 A | * | 1/1998 | Christensen et al. .......... 705/14 |
| 5,745,569 A | | 4/1998 | Moskowitz |
| 5,777,305 A | | 7/1998 | Smith |
| 5,864,604 A | | 1/1999 | Moen |
| 5,899,700 A | | 5/1999 | Williams |
| 5,905,248 A | | 5/1999 | Russell |
| 5,918,909 A | * | 7/1999 | Fiala et al. .................... 283/61 |
| 5,920,878 A | | 7/1999 | Demont |
| 5,933,829 A | | 8/1999 | Durst |
| 5,940,135 A | | 8/1999 | Petrovic |
| 5,943,423 A | | 8/1999 | Muftic |
| 5,949,885 A | | 9/1999 | Leighton |
| 5,953,415 A | | 9/1999 | Nielson |
| 5,995,105 A | * | 11/1999 | Reber et al. .................. 715/835 |

(Continued)

FOREIGN PATENT DOCUMENTS

JP    1166152 A   *   3/1999

(Continued)

OTHER PUBLICATIONS

Muhammad, T.K., "Pointing the Way to Cyber-Success," Black Enterprise, vol. 27, No. 4, pp. 44-46, Nov. 1996.*

(Continued)

*Primary Examiner*—Nicholas D Rosen

(57) ABSTRACT

The present invention is an apparatus for the money transactions required in the selling of merchandise or media content on the Internet and uses at least one in-person contact with the buyer. A predefined transaction originating at a real place of business authorizes access to web content or merchandise from a place off the web. Purchasers (end-users) must physically go to a retail location to choose the Internet media or merchandise shopping cart they wish to acquire where age can be verified if necessary and payment can be made with or without a credit card. Content security using a non-audible or invisible code signal sequence(s) can provide traceability as well as absolute anonymity for the purchaser. This apparatus can be used to conduct transactions off the web so that business can be done on the web.

27 Claims, 8 Drawing Sheets

U.S. PATENT DOCUMENTS

| | | | |
|---|---|---|---|
| 6,002,772 A | 12/1999 | Saito | |
| 6,005,643 A | 12/1999 | Morimoto | |
| 6,006,200 A | 12/1999 | Boies | |
| 6,018,720 A | 1/2000 | Fujimoto | |
| 6,035,177 A | 3/2000 | Moses | |
| 6,175,823 B1* | 1/2001 | Van Dusen | 705/26 |
| 6,278,980 B1* | 8/2001 | Wendkos | 705/14 |
| 6,405,175 B1* | 6/2002 | Ng | 705/14 |
| 6,434,535 B1* | 8/2002 | Kupka et al. | 705/24 |
| 6,467,684 B2* | 10/2002 | Fite et al. | 235/379 |
| 6,487,663 B1* | 11/2002 | Jaisimha et al. | 713/193 |
| 6,615,247 B1* | 9/2003 | Murphy | 709/217 |
| 6,708,157 B2* | 3/2004 | Stefik et al. | 705/59 |
| 7,209,889 B1* | 4/2007 | Whitfield | 705/14 |
| 2001/0001321 A1* | 5/2001 | Resnick et al. | 705/17 |
| 2001/0001854 A1* | 5/2001 | Schena et al. | 705/27 |
| 2001/0032878 A1* | 10/2001 | Tsiounis et al. | 235/379 |
| 2001/0037316 A1* | 11/2001 | Shiloh | 705/74 |
| 2002/0029241 A1* | 3/2002 | Yokono et al. | 709/202 |
| 2002/0069104 A1* | 6/2002 | Beach et al. | 705/14 |
| 2003/0093335 A1* | 5/2003 | Silverbrook et al. | 705/26 |
| 2003/0142035 A1* | 7/2003 | Goldstein | 343/895 |
| 2003/0158790 A1* | 8/2003 | Kargman | 705/26 |
| 2003/0200179 A1* | 10/2003 | Kwan | 705/65 |
| 2004/0015404 A1* | 1/2004 | McCarthy | 705/26 |
| 2005/0192896 A1* | 9/2005 | Hutchison et al. | 705/40 |
| 2008/0046375 A1* | 2/2008 | Jakubaitis | 705/51 |

FOREIGN PATENT DOCUMENTS

WO      WO-9819260 A1 * 5/1998

OTHER PUBLICATIONS

Goldstein, A., "Computer City Opens Prototype in Mesquite, Texas," Dallas Morning News, Nov. 22, 1997.*

Buelva, A.J., "Philippines: Union Bank Launches Net Banking Initiative," Computer World (Philippines), Dec. 15, 1999.*

Jakubaitis, U.S. Appl. No. 60/140,929.*

Mambo, Masahiro, editor, "Information Security," Second International Workshop, ISW '99, Kuala Lumpur, Malasia, Nov. 1999 Proceedings.*

Remus, P.C. et. al, "Digital Signatures: THe Nest Step in Electronic Commerce," New Hampshire Business Review, vol. 19, No. 10, p. 15, May 1997.

Gentry, C.R., "Chain Cultivates Farming Niche," Chain Store Age, vol. 76, No. 3, pp. 67-77, Mar. 2000.

Anon., "Appearing Soon at a Store Near You: An ATM for the ears," New York Times, vol. CXLIX, No. 51,364, p. D7, Apr. 2, 2000.

Anon., "Mala Powers: Hollywood Star Still Shines on Walk of Fame," Business Wire, Sep. 27, 1994.

Dyson, P., "Millicent: Digital Equipment's Scrip for Selling Content by the slice," Sybold Report on Internet Publishing, vol. 2, No. 3, p. 37, Nov. 1997.

Oser, K., "Wells Fargo Launches ATM Advertising," Direct, vol. 11, No. 5, p. 22, Apr. 1999.

Microsoft Press Computer Dictionary, 3rd Edition, Microsoft Press, 1997, See p. 82, Definitions & CD Rom burner & Recorder.

Unknown, Electronic sell-through is the future of VOD, BroadCast Engineering, Strategic Content Management Newsletter, Jul. 26, 2005, USA.

Unknown, Coming soon: Download-to-own films, CNN, Technology Section, Mar. 24, 2006, USA.

Unknown, Schedule of Minimums, Writers Guild of America, 2008, Theatrical and Television Basic Agreement, Feb. 13, 2008, USA.

NetPack, Inc., Press Release, New Internet Packaging System, Allows Consumers . . . , Lexis-Nexis, Financial Times Information, Feb. 21, 2001.

Levi Shapiro, Hollywood goes EST, Entrepreneur Connect, Entrepreneur Media, Inc., Apr. 2008 issue.

Stefanie Olsen, CinemaNow debuts Download-to-own movies, CNET News, Jan. 4, 2004.

Superdistribution. (May 29, 2009). In Wikipedia, The Free Encyclopedia. Retrieved 10:45, May 29, 2009, from http://en.wikipedia.org/w/index.php?title=Superdistribution&oldid=2.

Case 2:09-cv-00140-DAK, Document 15-2, 15-3 (Jun. 24, 2009). Administrative Office of the U.S. Courts, PACER CM/ECF, retrieved Jul. 23, 2009.

Pete Cashmore, Big Brother: Amazon Remotely Deletes 1984 From Kindles, retrieved Jul. 23, 2009 from http://mashable.com/2009/07/17/amazon-kindle-1984/.

* cited by examiner

FIG. 5
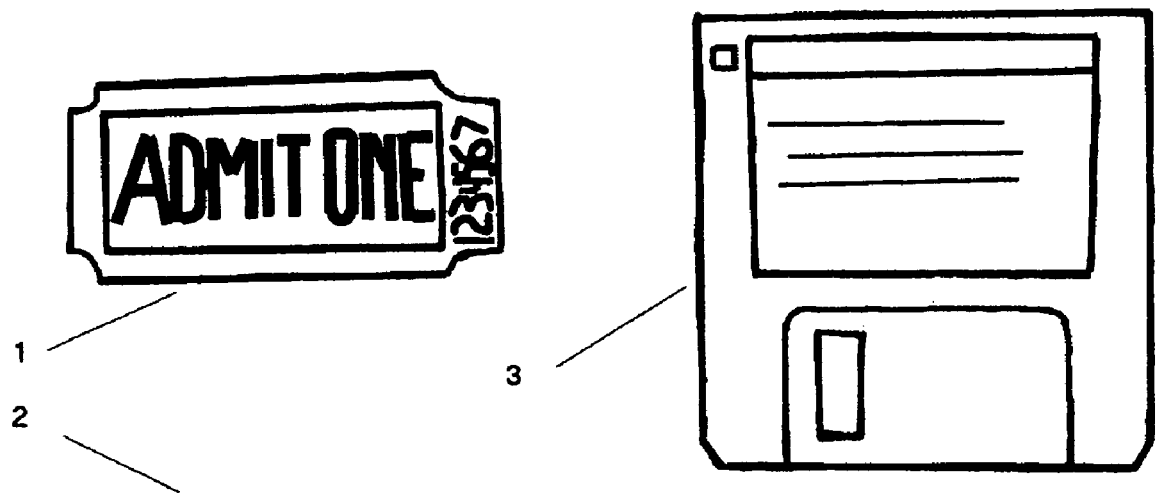
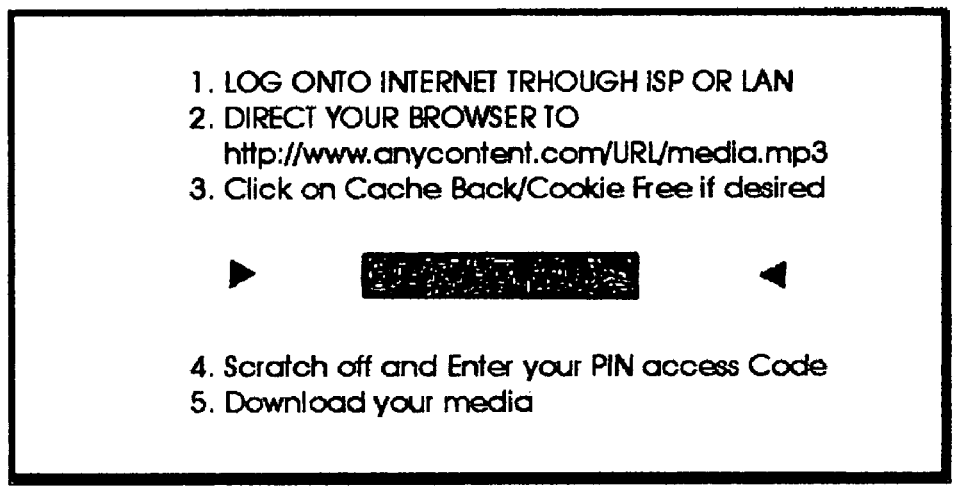
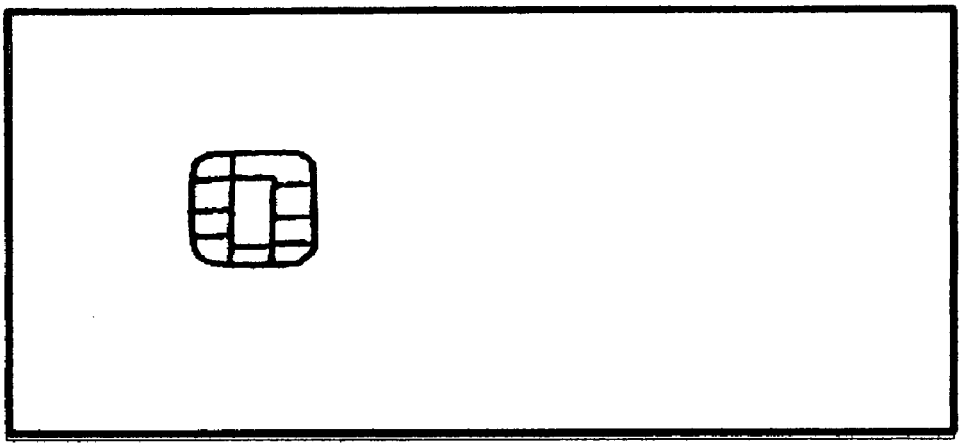

FIG. 7
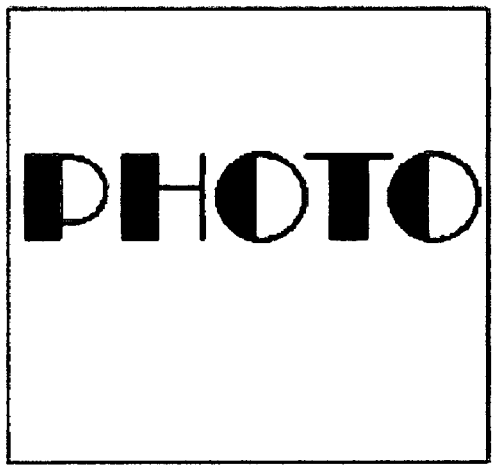
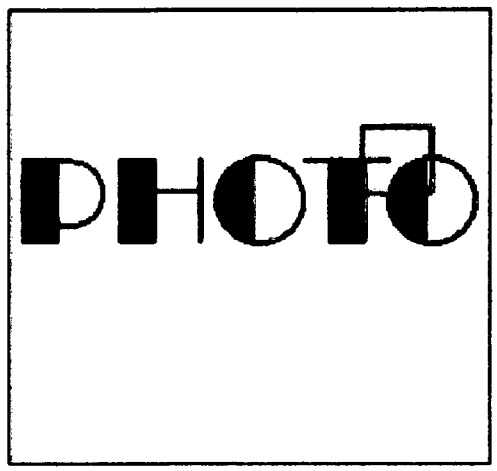
Zoom of Selected Area
Pixel Selection
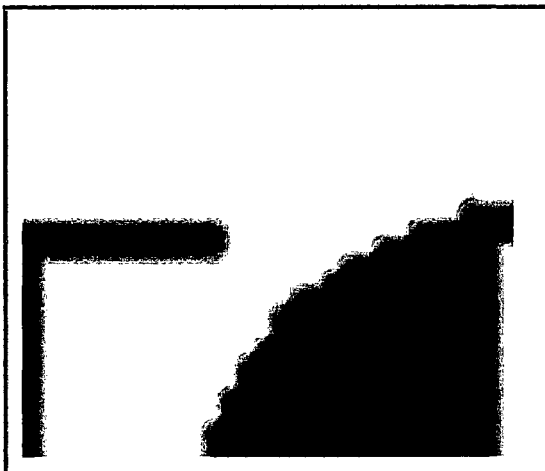
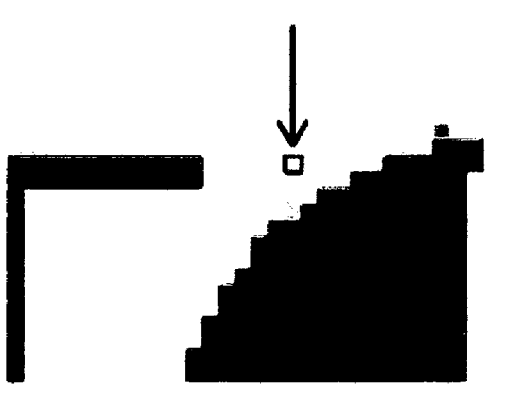
Normal Pixel
Example: After hidden pixilization
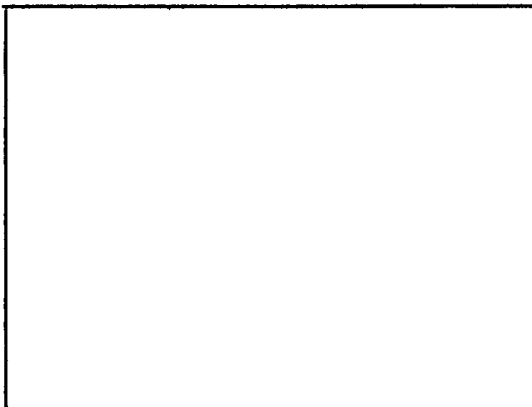
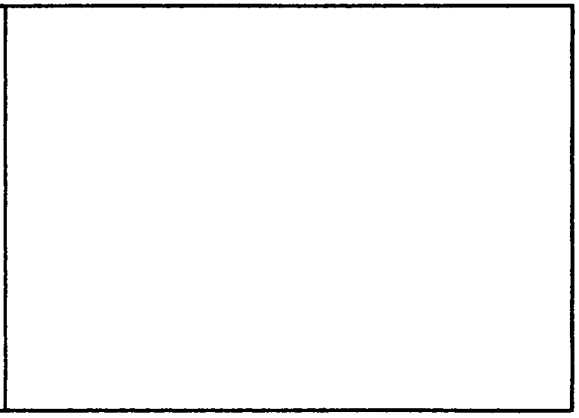

FIG. 8

| Courier 10 BT | Courier New |
|---|---|
| A | A |
| B | B |
| C | C |

RETAIL POINT OF SALE (RPOS) APPARATUS FOR INTERNET MERCHANDISING

RELATED APPLICATIONS

Priority is claimed in this application to the Utility patent application Ser. No. 09/630,272, titled "Retail Point of Sale Apparatus for Internet Merchandising," filed on Aug. 1, 2000. Priority is also claimed through Ser. No. 09/630,272 to provisional patent application submitted on Jun. 30, 2000 under same inventor's name, entitled Access Card for Internet Content (ACARD), provisional application No. 60/215,673.

FEDERALLY SPONSORED RESEARCH OR DEVELOPMENT

Not Applicable

SEQUENCE LISTING, TABLE, OR COMPUTER PROGRAM ON CD

Not Applicable

BACKGROUND OF INVENTION (1) Field of the Invention

This invention relates generally to purchasing systems via a public computer network system (Internet or World-Wide-Web). While the products sold on the Internet are often real and tangible, the market place exists in a virtual realm. To conduct the business of selling in the virtual realm of the Internet, a virtual transaction had to take place; or so it has been thought. This Invention requires non-virtual transactions that take place at a retail point of sale for a means of virtual merchandising.

(2) Related Prior Art

Retail industries can exist anywhere. The historical version of retail was the actual retail point of sale. A retailer established a store where customers could visit, look at merchandise and make purchases. The customer had to visit the store in order to purchase the products. Other forms of retailing have existed like local street vendors, door-to-door salesmen, shop-by-telephone, mail order catalogs, infomercial shop-by telephone, and most recently, the Internet.

To understand the difference between this invention and prior art, one must first be able to understand the differences between retail point of sale and other methods of sale. There is always a time variable involved with merchandising transactions, but one should not make the mistake of assuming that time is the essential element that distinguishes between direct purchases and those on account. The basic formula for establishing a credit account is where the purchase price (P) of a product can be paid at a later time (T), an interest rate (R) can be assessed, and the amount paid $(A)=P(I+R)^T$.

A person may gain extra time to pay for a purchase by using credit, but it is the agreement between parties that one will extend credit to the other that creates a credit account. Time has no meaning in the direct purchase formula (A)=P. For that matter, there is always some lag between the time payment is tendered and possession takes place even if for just split seconds. Sometimes a lag between payment and possession requires a voucher so that the purchaser has some proof that payment has been made. The voucher is usually just a simple sales receipt. Other times it can be a ticket such as for attending a theater or other engagement. The voucher in this case does not represent an account or value of money. The voucher merely represents that the transaction has been completed and the merchandise, whether physical merchandise or simply entertainment, has been authorized.

Retail points of sale transactions involve at least one in-person contact with the buyer. On the Internet, it has always been assumed that this transaction must be conducted virtually on the Internet; after all, the Internet is a virtual realm. With the huge rise in popularity the Internet, there are rising concerns from the public about who should and who should not be able to access certain Internet content such as but not limited to: materials with copyrights such as music, content that is adult in nature, or other restricted access material.

Regulatory authorities and web masters have made attempts to control access through the selling of access rights over the Internet itself. These services are often called subscription based I.D. or age verification services. User names and passwords or other means of secure access have been delivered to consumers after they entered credit card information. This has become an accepted means of control, particularly with Adult Verification systems.

Public Key infrastructure (PKI) is one method that has evolved into a secure and anonymous means of handling web transactions through the uses of encryption, trusted vendors, and trusted banking institutions. PKI methods of Web transactions involve digital signature and money transactions over the Internet. They require a customer, a bank, a merchant, a public archive such as an Internet web site, Certificate Authorization servers, and encryption and decryption of the data.

Most secure web transactions require cookies and Web delivered applets (such as JAVA). A cookie is information that a Web site puts on an end-users hard disk so that it can use the information at a later time.

Using the Web's Hypertext Transfer Protocol (HTTP), each request for a Web page is independent of all other requests. For this reason, the Web page server has no memory of what pages it has sent to a user previously or anything about previous visits. A cookie is a mechanism that allows the server to store its own information about a user on the user's own computer. For example, the Internet Explorer browser stores cookies in a Windows subdirectory. Netscape stores cookies as a single text file.

RETAIL POINT OF SALE APPARATUS (RPOS) FOR INTERNET MERCHANDISING is a return to the simplistic approach of pre-Internet ways of doing business, but it is not an obvious approach. As malicious attackers of Internet communications become more common, the Internet security measures become increasingly sophisticated. The RPOS takes away some of the sophistication and uses much simpler yet effective technology in its place. The predefined transaction authorizes access to web content from a place off the web, originates at a real place of business, and is a concept that a trained Internet professional may not be able to grasp immediately; they have been conditioned towards more complicated means of accomplishing the tasks directly on the Internet.

The U.S. Patent and Trademark Commissioner announced that the Agency would be revamping its patent examination guidelines for computer-related inventions and e-commerce practices, see United States Patent and Trademark Office RIN 065 I-AB20. RPOS would not negatively affect any electronic commerce as it currently operates. It would primarily be used in conjunction with current methods. A return to a retail establishment for conducting Web business may hold great promise for Internet security in the future. A search of past practices and inventions reveals a great deal of effort spent on avoiding over-the-counter transactions for Internet e-commerce rather than embracing it as does the RPOS technology.

(3) Prior Art Differentiated

There are three key questions to be asked when attempting to differentiate the technology:

Do they take cash?

Is there an establishment that acts on behalf of the customer for payment that employs non-virtual (Retail point of sale) to complete the transaction?

Does the customer have to physically go to the establishment to buy it?

The field of Internet e-commerce has numerous existing patents. A complete search for prior history was not done prior to this filing but a few similar patents were found through a most basic search of the on-fine USPTO patent databases. They are reference below to help set the stage for one skilled in the art of Internet commerce to understand the differences between RPOS and previous methods.

This invention is not a Prepaid Internet Access Card, such as used to supply the purchaser of minutes on an Internet Service Providers (ISP) system, see US examples U.S. Pat. Nos. 5,749,975; 5,987,612; 5,749,075, 5,987,430.

This invention is not merely a method for recording information on a card, computer disk, or other means of recording, see US example U.S. Pat. No. 6,076,733. The method of recording might be bar code, magnetic tape, smart card, written inscription, or any means of recording information. This invention is not used to locate a specific URL, but is used to divine the predetermined transaction that provided access to a particular URL location.

This invention is not an organizational Internet access security system whereby business organizations control access to web content of their own employees or to others on a closed network or to generate personalized content pages for specific business purposes, see U.S. Pat. No. 6,076,166

This invention is not an Internet cash token system used as an anonymous means to get money to spend on the Internet. See US examples U.S. Pat. Nos. 6,076,078; 6,072,870; 6,061, 660; 6,042,149

This invention is not electronic-voucher system, which places a third party URL as the guarantor of funds. See US example U.S. Pat. No. 6,058,381.

This invention is not a mobile Internet media content delivery device in which the device itself carries the content. See US examples U.S. Pat. No. 6,018,720.

This invention is not a means to preview merchandise and set up an account to purchase—as in U.S. Pat. No. 5,918,213, where the merchandise merely previewed at the point of sale, but then the transaction is conducted as an off the shelf purchase, through typical Internet methods, or phone-in-sale automated means. The retail point of sale apparatus for Internet Merchandising is a new means for conducting the actual transaction that could be added to such a system.

This invention is not a device for delivering media content through on-line programmable smart card authorization such as used in satellite television programming, or Web TV devices, where a home user of the system can call in on the telephone to order Pay-per-view programming. In these systems the smart card both receives and supplies data to the system over a private network. RPOS does not require programming after the initial over-the-counter transaction.

Although the user of the RPOS may be known, it can also be used completely anonymously.

This invention is much like an event ticket to a movie theater or music concert except that the RPOS is specifically used for access (entrance) to Internet merchandising.

While RPOS can facilitate Secure Web Transactions, it is not a method of the transaction, merely a method of divining the existence of a predetermined web transaction. It does not require a trusted vendor, trusted bank, or buyer authentication. While RPOS may facilitate some of the same types of functions mentioned above, it uses a completely new method.

BRIEF DESCRIPTION OF THE INVENTION

This invention is essentially retail point of sale for the Internet. In order to best set the stage for a reader of this patent application to best understand the background of this invention and distinguish it from prior art, several descriptive names of the invention are listed below. This is not intended to be an exhaustive list but merely illustrates some of the ways such an invention can be used. After this list, for the remainder of this document, the Invention will be referred to as the RPOS. Although it involves a voucher system, the voucher need not exist in all circumstances. RPOS can use a disk, paper ticket, memory stick, or any other means of supplying an access key and utility program.

Descriptive Names
1. Internet Content Voucher System
2. Cookie Free Cache Back System Card
3. Prepaid Card for Internet Content Media
4. Web Content Ticket
5. Over the counter Internet Sale
6. Simple Anonymity for Internet Content Delivery
7. Face to Face Verification System for Divining of Anticipated Internet Transaction
8. Non Virtual Point of Sale for the Internet
9. Retail Point of Sale Card for Internet Content
10. Internet Authentication Card
11. Internet Adult Verification Card
12. Internet Allocation Card The RPOS is an "actual point of sale" device for Internet content. Previous waves of invention attempting to satisfy the needs of secure web content on the Internet have delivered many "virtual point of sale" techniques and emphasis has been on the transaction itself and how to exchange money over the Internet.

When considering Prior art, the RPOS invention differs most noticeably from previous methods in the way it does not follow the trend to do everything on the Internet and uses "actual point of sale" as the place where a predefined Internet sales transaction takes place. The information provided by web delivered cookies or applets is not required by RPOS because the information is already included; it is hand delivered to the computer by the user.

DESCRIPTION OF INVENTION

A security access key is provided in the form of a prepaid card sold as a retail item. The access key has a one time or multiple Internet session use as provided by the seller of the card. Through obtaining the CARD, the purchaser gains access to the website or specific web page(s) intended by the seller for either a defined duration of time or indefinite duration of time. Any time the end user (customer) of the CARD is on the Internet, a very simple utility program may be deployed to ensure that there are no changes to the cache content of the customer's computer and no cookies are accepted or transmitted during the delivery of the media content. The utility of the invention is that it provides a method of controlling web access that requires at least one transaction be completed in person. No connection to a banking system for credit referencing is required, no vast system of computer networks is needed to verify anonymity and account status. The actual transaction takes place over the counter. The delivery takes place on a computer of the users choice.

The CARD is a voucher system that is used only to authenticate that the user of the card is in fact the one in possession of it. The user of the CARD uses the card to access the content or merchandise from the computer of their choice. As the time required for the user holding the card to receive the desired content is decreased, the need for the CARD itself may become unnecessary. The content itself may be recorded to disk compact disk, cassette, VHS tape, or other recording media: the media may be recorded at the point of sale location.

The content that is recorded may be Internet content media or the content may be the purchase agreement for merchandise. When the content is a purchase agreement for merchandise, the payment can be made for the merchandise by the RPOS. The RPOS assumes responsibility for payment to the Internet vendor and the purchaser specifies the shipping address of such merchandise. The CARD in this situation may simply be a receipt of sale or other proof of payment.

Unlike any previous method of payment for Internet commerce in the past, there is no account, credit, or other means of electronic payment required for the buyer in the transaction. The proof is within the content itself. The content becomes the verification of a sale. Internet merchandisers such as but not limited to Amazon, Barnes and Nobel, Buy.com, Outpost, and others provide a verification page for each sale, which they intend to be printed by the user. These types of verification pages are excellent examples of specific URL information that can be determined ahead of time and sold whether it is for merchandise or content media.

When the purchase is for non prepackaged merchandise such as Content media, the media may be individually licensed with a unique serial number for protection against counterfeiting. Content fingerprinting is one of the methods used. Traditional digital signature may also be used.

Content Fingerprinting,

In the Industry of Internet publishing, one of the problems has been unauthorized copying, posting or otherwise revealing of sensitive materials for wide distribution. Millions of dollars in uncollected royalties are lost each year. Publishers have no way of detecting the responsible parties who willfully post the materials or otherwise "leak" the materials for wide distribution. The answer to the problem is a mechanism or way to "mark" individual copies of recorded material for licensing so the publishers can feel confident that appropriate royalties are being paid. The "mark" should be something not easily detected or removed.

The Graphical User Interface (GUI) of the program uses two side by side text windows, One window is for the visible message and the other window is for the shorter encoded information, Once the two messages are input, the user clicks on a button for encoding which makes all the necessary adjustments to encode the hidden information into the visible message and saves to one file.

This document suggests just some basic methods of fingerprinting Internet content: Font Fingerprinting, hidden pixelization, concealed ASCII and non visible/inaudible codification.

Font Fingerprinting

Bar codes are typically comprised of black and white stripes, yet all that a bar code really represents is a binary code. For Font Fingerprinting of Internet content, hidden binary codes are placed into documents so that a specific record of the content travels with the document. It is much different from digital signature for example where the file itself is tagged and encrypted and can't be read unless the proper keys are used to decrypt the message. For fingerprint marking of the document, the mark stays with the document even after it is properly received and possibly changed.

A base font is modified only slightly so as to not be immediately noticeable to the human eye, yet enough for machine recognition. The base font becomes the "0" of the binary and the modified font is the "1". Any text string can be modified to imprint a binary coded binary (BCB). The decoding is later accomplished using a scanner with a character recognition system capable of distinguishing the font differences.

Font fingerprinting is particularly designed to be most readily used for printed media, but the fingerprinting could also follow a soft copied document provided the file format remains Rich Text Format (.RTF) or better, giving access to the font aberrations. The font set used for printing the "fingerprinted" document must also be available to the computer that receives the document. Future developments could include a highly compressed file format capable of self decompression that would mask the fact that the Distributed font set is traveling with the document.

Another method of sending a font generated BCB with a softcopy document, not requiring a font subset file, mixes two available fonts that are a close match such as Courier New with 11 point font and Courier 10 BT with a 10 point font (see FIG. 9).

While the above mentioned combination is readily visible to the naked eye, the text is not noticeably different unless you know what you're looking for. It was just an attempt at finding a good match, but there may be other good system fonts that are a close enough match.

Hidden Pixelization

The format of choice for delivery of images over the Internet has been the jpeg, formally the ISO standard 10918, which keeps the file size for delivery fairly small. All digital images of this type are made up of tiny pixels. For hidden pixelization, a jpeg image is converted to a similar image of a higher resolution (more pixels). In other words any single pixel in the original image is recreated as multiple pixels all of the same color. For example a 320×240=76,800 pixel image becomes a 640×480=307,200 pixel image, or roughly four pixels per one pixel of the original image.

Several of the pixels from these new higher resolution images can then be encoded with a BCB by varying the shades within the 4 pixels only slightly leaving the neutral color of the original larger pixel essentially unchanged. Any documents delivered over the Internet that contain these images are thereby permanently marked.

This re pixelization creates four available binary codes in the original pixel. The original color is the "0" code and the slightly changed shade is the "1" of the binary. One of the keys to making this system less detectable is to disguise the encoding by causing the encoded jpeg file to still report to the user that it is still a 320×240 image when in fact it has been changed to a 640×480 image and then report back to the viewing system the proper resolution. If the user resaves the image into a different format such as GIF, the code may or may not be transferred, but as long as images in documents are untouched, the document remains fingerprinted.

Concealed ASCII

ASCII stands for American Standard Code for Information Interchange. ASCII was developed a long time ago and the characters are not always used in the same way on different computer systems. ASCII was originally designed for teletypes and the first 31 characters in today's applications are no longer used as originally intended. Concealed ASCII finger printing takes advantage of the fact that several of them act the same as the ASCII character "032" in many applications. ASCII 32 is the code for a blank space.

ASCII characters 0, 10, and 13 do not display anything on most Windows applications. Character 9 will move to a tab, making a long blank space. 16 25 and 27 31 produce a black area on the screen in some applications and a blank area in others. So do 19, 11, 12, 14, and 15 on some Windows applications; however, they often cause error messages in the compiler for many applications.

Concealed ASCII can create a BCB by using the standard ASCII 32 in spaces as the "0" character of the binary and an alternate ASCII 0, 10, or 13 with ASCII 32 as the "I" character of the binary.

Example: The quick gray fox jumps over the lazy brown rabbit.

There are nine spaces to use for the BCB in the preceding phrase. The code in the example above reads 010000111. The code for the 2nd, 7th, 8th, and 9th spaces in the phrase is ASCII 10 followed by ASCII 32. The remaining spaces simply use ASCII 32. While the concealed ASCII fingerprinting is not printable, it can be used to travel with text of a printable document.

Concealed ASCII can easily be lost when transmitted as plain text over the Internet and other systems, but many documents are transmitted over the Internet in specific file formats that would maintain specific ASCII sequences not visible to the reader without looking to the particular codes that generated the text.

Non Visible or Inaudible Codification

Analog signals of non discernable frequencies for human ears or eyes are individually dubbed into audio recordings, which can later identify the origin of the recording. The sights or sounds are created using a frequency, signal generator, or other means of creating analog signals. The analog signals, which cannot be heard by humans on the recording, can be used for distribution of copyright materials such as mp3 music or dubbed into the soundtrack of a video that is distributed on the World Wide Web (Internet).

Identical songs or videos by the same artist can become individual versions that are licensed to individuals. Using sensitive digital software and computer sound editing tools available from a number of manufacturers the sights and sounds outside the range of human discernment can later be detected to verify if the recording is in fact licensed and who is the owner of the license. The analog signals essentially encode any individual identification to a song, video, or other media that contains audio or video tracks.

The human sound range is between 20 and 20,000 hertz for a young person and much less for an old person. The human visual range for light fies within a range around 109 MHz. Visual analog signals can also be dubbed into digital video recordings. The key to non visible or Inaudible Codification is merely that that signals are dubbed into the content and not just on the file itself Content Fingerprinting Usefulness Content fingerprinting would be used for printing secure documents, discouraging unauthorized use, sending secret encoded messages, authentication of modification of documents, counterfeit detection, or other application requiring secure distribution of Internet materials. Content fingerprinting differs from digital signature or digital watermark in that the fingerprinting is not on the file itself but on the content of the file.

Fingerprinting documents is a useful and new idea. The usefulness of the specific methods shown here is greatly diminished when patented and the PTO discloses to the public. The actual methods of fingerprinting really should be kept as "Trade Secrets". The above methods are not fool proof or even sophisticated enough to hold up against even the least sophisticated of hackers. They are merely offered here as examples of how to individually license Internet materials. As industry looks to the Internet for delivery of every kind of copyrighted material, there will be other specific methods of fingerprinting. Since, nobody is working on this type of copyright protection: the concept itself might be of strategic advantage. Fingerprinting Internet delivered media may involve documents, images, videos, sound tracks, or any other type of media that can be produced for the Internet.

In the method of providing a level of security in transfer of ownership for prepaid media content over a public computer network (Internet) using a computer can be accomplished using individually coded license, serial number, or other identifying mark through content fingerprinting.

It can use first a visible, audible, or otherwise humanly detectable label version of serial number, coded license number, or other identifying mark; a second label that is only machine visible, audible, or otherwise detectable version of serial number, coded license number, or other identifying mark; and the machine only visible, audible or otherwise noticeable label could be a coded message capable of singularly distinguishing the content from other content of the same or similar type. Any means of recording, writing, or otherwise placing a machine visible or audible code on Internet media content would be useful for content fingerprinting purposes.

DESCRIPTION OF DRAWINGS

The following drawings provide examples of different applications and construct specifications for the RPOS technology. They are not meant to be inclusive of all uses, they are merely examples.

Figure 1:
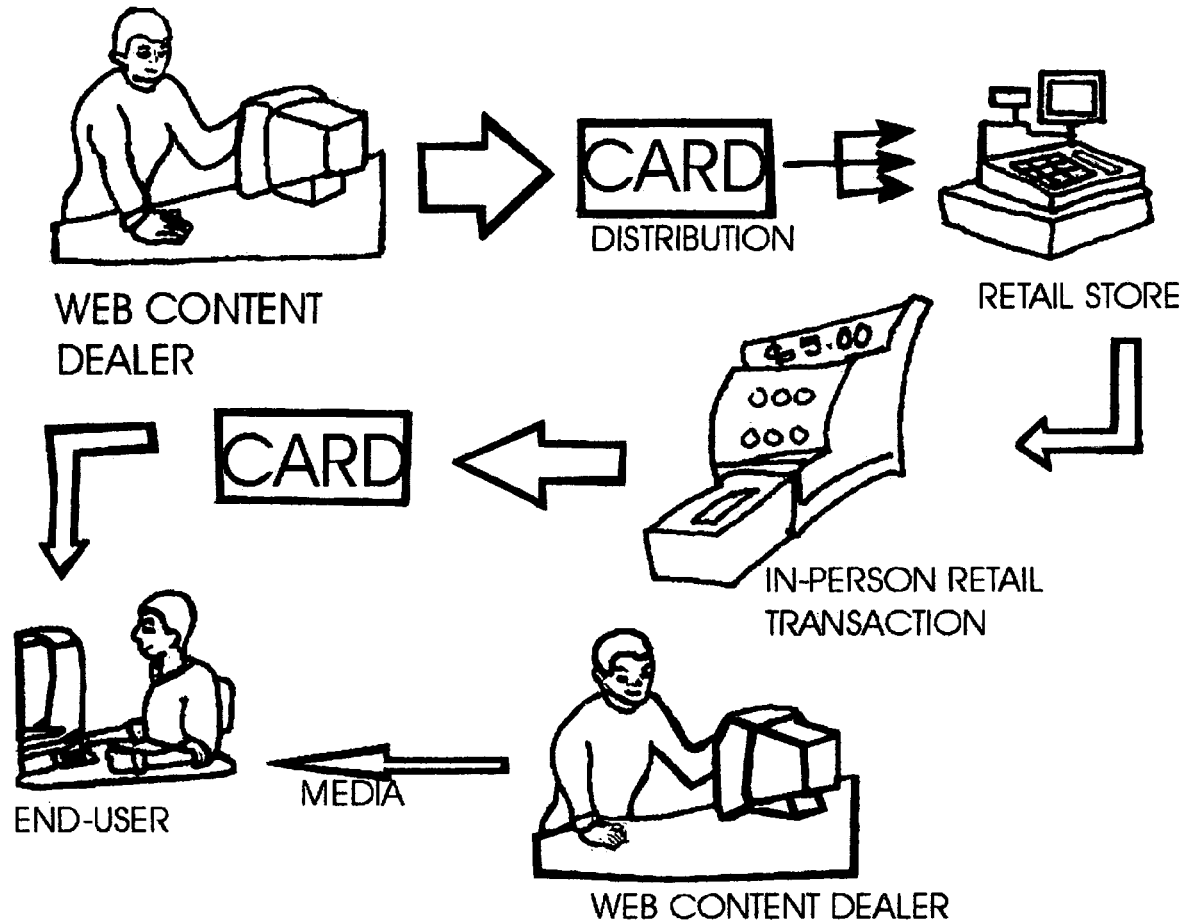
FIG. 1 uses a flow chart to illustrate a use of the RPOS. The process begins with web content dealers who have content posted to a public computer network (Internet) and have chosen to use RPOS for distribution. The web content dealers may manufacture the card themselves or use a third party. The type of security system used for placing the access key on the card is only important as to the particular level of security that is desired. The web content dealer then distributes the ACARD, directly or through distribution channels, to a retail establishment. The retail establishment sells the CARD over the counter to the customer. The dealer, distributor, and retail establishment may use whatever profit margins or price mark ups as they choose or is agreed upon. The CARD is delivered to the customer like any other retail product. Continuing along the flow chart in FIG. 1 to the customer, the CARD is used to access only the web content that is predefined by the CARD. The purpose of the CARD in this transaction is only to ensure that the user is in possession of it. The transaction takes place through an over the counter sale.
Figure 2:
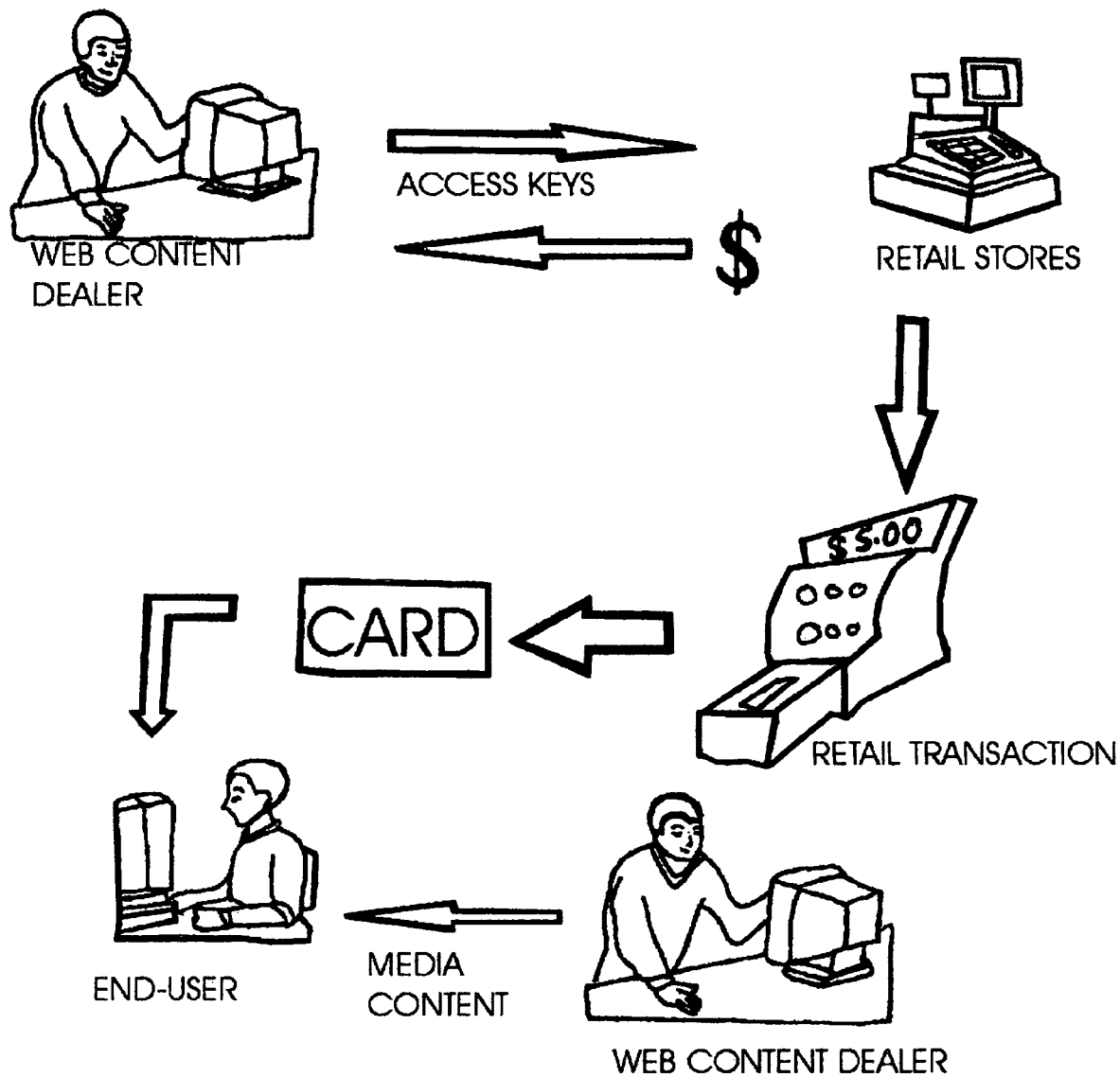
FIG. 2 uses a flow chart to illustrate an alternate use of the RPOS, which is the construct specification for claim 3 in this application. The process again begins with Web Content Dealers. In this application the Web Content Dealers may or may not subscribe to the RPOS system (i.e. make their own CARDs). To facilitate the creation of a CARD for the WEB Content Dealers, a retail establishment supplies a computer or terminal as a customer access point, which provides Internet access, and issues a CARD to a customer upon entering the retail establishment. The customer browses the web and looks for content to purchase. Whenever a Web Content Dealer requires some sort of payment and the customer agrees, the customer authorizes payment from the retail establishment and by default the retail establishment agrees to the purchase. The customer is not required to enter his or her own name, credit card payment information, address, or any other information that they do not choose. Upon leaving the establishment, the customer pays the retail establishment the amount required for content received or to be received. The purpose of the CARD in this transaction is only to ensure that the user is in possession of it. The actual transaction takes place through an over the counter sale.

The processes described in FIG. 2 illustrate a subtle yet important difference from prior art used in Internet commerce, in that Internet access is only required for the customer to choose which media content to purchase and to later retrieve on whatever computer the customer chooses. Internet access is not required during the recording of specific media content locations (URLs); they can be simply written down, picked out from a written menu after having seen the web dealers preview pages, or retrieved as a menu item from the local computer at the check out. Internet access is also not required during the recording of the specific access information, or during the retail transaction. While Internet Access during these processes may be used to facilitate the RPOS processes, it is not required. While the CARD holds some intrinsic value it does not hold any dollar amount information, account information, or other means of payment; the transaction is completed in person at the checkout.

Figure 3:
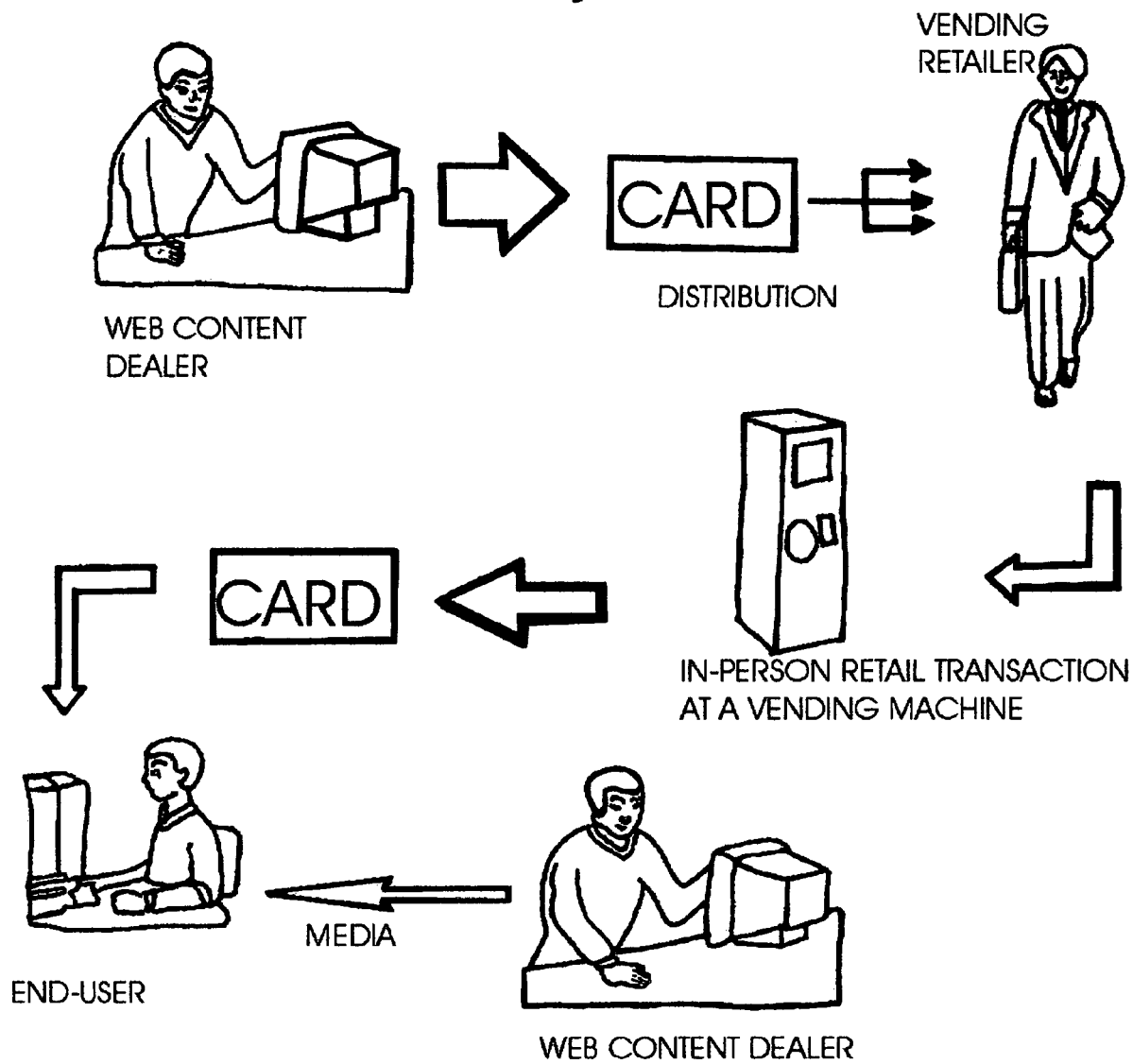

FIG. 3 uses a flow chart to illustrate an alternate use of the RPOS. The process again begins with Web Content Dealers. A Vending Machine Dealer purchases CARDs through normal product distribution channels. Customer purchases the CARD from the vending machine acquiring the ability to access the desired web content. This type of system is not capable of age verification as with over the counter sales. Again, the purpose of the CARD in this transaction is only to ensure that the user is in possession of it. The actual transaction takes place through a vending machine.

Figure 4:
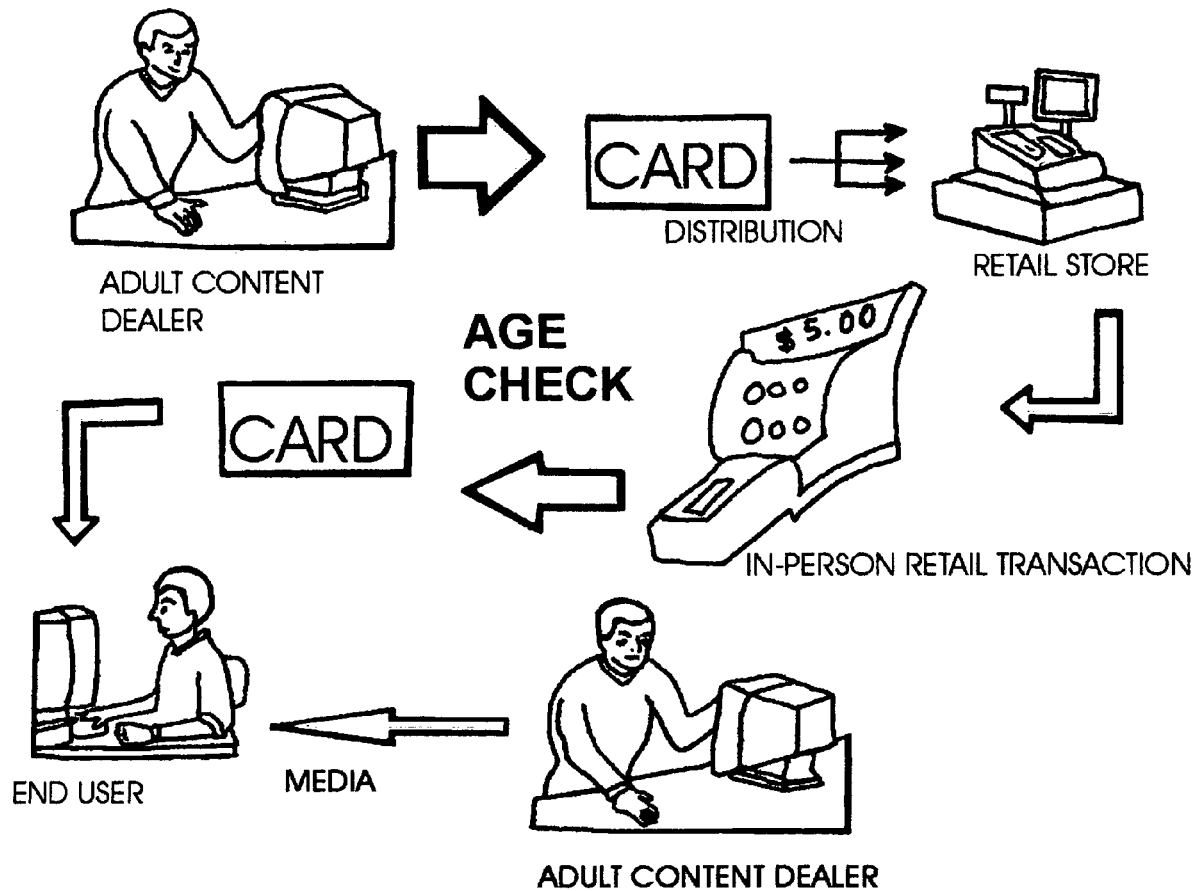

FIG. 4 illustrates how CARD is used as an age verification system (Adult Check). The process begins with dealers of adult materials on the Internet. A retail establishment (such as video rental store, convenience store, bookstore, adult merchandiser, or other type of store) obtains CARDs through typical distribution channels. Customers purchase the CARD over the counter provided they can prove they are of legal age to do so. Customer physically transports the CARD to a location where customer has access to a computer that is capable of receiving Web content. The customer uses the CARD to obtain access to those specific materials the seller of the CARD intended.

FIG. 5 shows some examples of recording devices that are used or could be modified for use as the media delivery method, access CARD, or to deliver the small cookie free cache back application.

Figure 6:
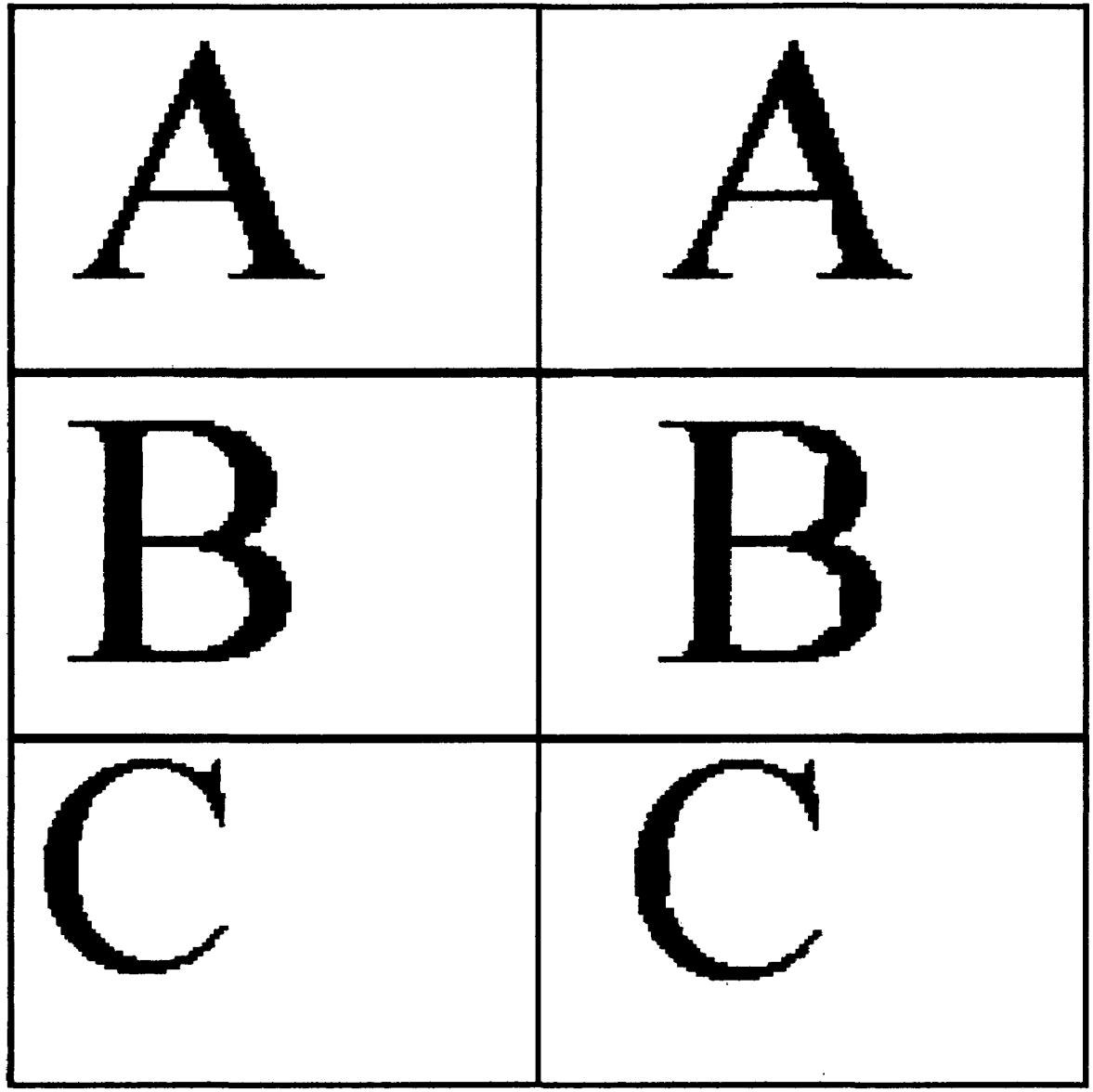

FIG. 6 is an example of Font Fingerprinting where a font subset file must be delivered to the user.

FIG. 7 is an example of Hidden Pixelization for Content Fingerprinting.

Figure 8:
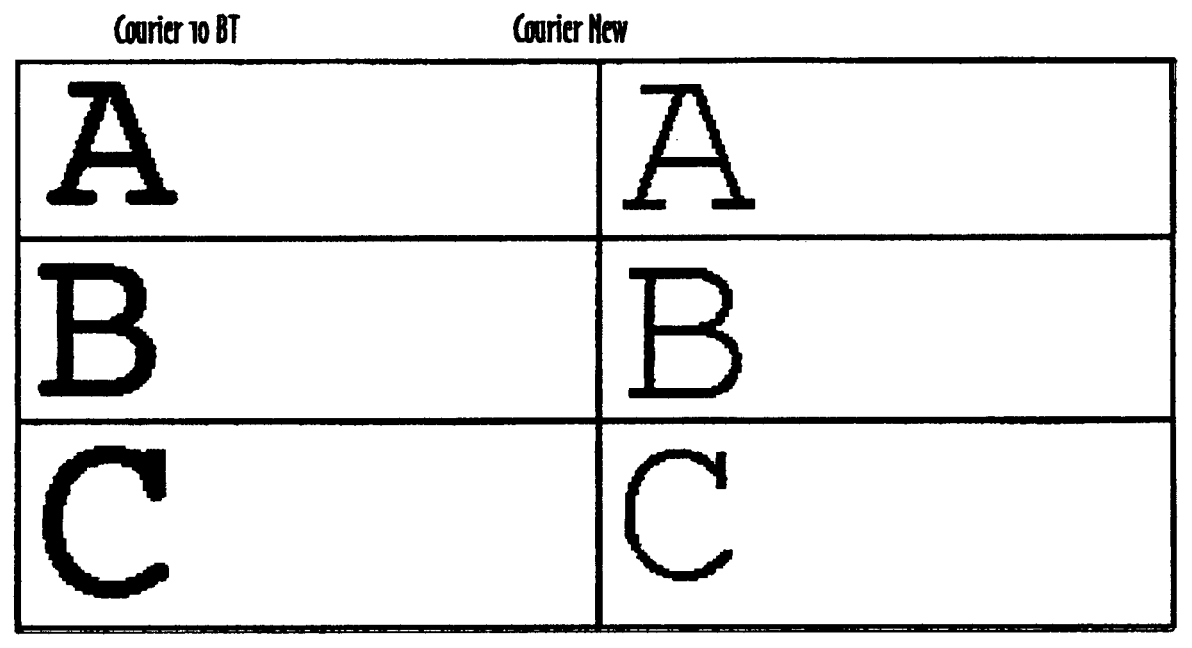

FIG. 8 illustrates the similarities between the New Courier font and the Courier 10BT font.

The invention claimed is:

1. A method of virtual Internet based merchandise or media exchange for payment, comprising:
   creating specific information that is a transaction location of a product, said product comprising line itemized networked merchandise or line itemized download-to-own media material objects on a selling computer on a network;
   creating specific information that is a transaction location of said product on a selling computer operating for a purpose to sell said product;
   specifying a price wherein said price is specific to said product;
   providing customer access to a retail point of sail location;
   accepting payment of said price through an in-person transaction at said retail point of sale location wherein said payment is designated for said product through said in-person transaction;
   associating said payment to a purchase of said product for said price;
   establishing an electronic communication between at least one user owned device on a network, wherein said user owned device is operated by a user desiring to buy at least one said product, and said selling computer on said network;
   sending a payment message as a response to said in person transaction either directly or through other computers on said network to said selling computer on said network;
   causing an authorization message to be created on said selling computer in or as a result of said payment message; and
   causing transfer of ownership rights in said product to said user desiring to buy said product by granting access or rights to said user on said user-owned device either directly or through other computers on said network, as a result of said authorization message on said selling computer.

2. The method of virtual Internet based merchandise or media exchange for payment in claim 1, wherein said retail point of sale establishment further comprises: a retail store, convenience store, vending machine, parking lot, lobby, self-service, hallway, gymnasium, concert hall, street vendor, or other physical place to conduct business.

3. The method of virtual Internet based merchandise or media exchange for payment in claim 1, wherein said providing customer access to a retail point of sale location, further comprises: providing customer access to a checkout, kiosk, cashier, cash register, self-check out, self-service, traveling sales person, or any other means of in-person contact with said customer by said retail point of sale establishment directly or through representative.

4. The method of virtual Internet based merchandise or media exchange for payment in claim 1, wherein said specific information that is a transaction location of said product, further comprises a Uniform Resource Locator (URL).

5. The method of virtual Internet based merchandise or media exchange for payment of claim 1, wherein said authorization message comprises at least said specification of said product and authentication based on cryptographic key(s), said selling computer being programmed to receive said payment message for verification of said authorization message; and
   causing said selling computer, as a result of said selling computer being programmed, to ensure that said authorization message was created using said cryptographic key(s).

6. A method of vending a voucher to a purchaser, the method comprising:
   providing customer access to a customer at a retail point of sail location;
   creating a voucher containing specific information on, in, or actuated from said voucher where said information is a transaction location of a product, said product comprising line itemized networked merchandise or line itemized download-to-own media material objects on a selling computer on a network;

specifying a price wherein said price is specific to said product;

accepting payment of said price for said voucher through an in-person transaction at said retail point of sale location wherein said payment is at least zero;

vending said voucher at said retail point of sale to said customer, wherein vending the voucher to the customer transfers ownership of said product comprising line itemized networked merchandise or line itemized download-to-own media material objects to said customer wherein said transferred ownership is only redeemable on a network;

associating said payment to a purchase of said product for said price;

establishing an electronic communication between at least one user owned device on a network, wherein said user owned device is operated by a user desiring to buy at least one said product, and said selling computer on said network;

sending a payment message as a response to said in person transaction either directly or through other computers on said network to said selling computer on said network;

causing an authorization message to be created on said selling computer in or as a result of said payment message; and redeeming said transferred ownership through an end-user device.

7. The method according to claim 6, wherein the network comprises the world wide web.

8. The method according to claim 6, wherein the network comprises a telephonic network.

9. The method according to claim 6, wherein the network comprises items selected from the group consisting of satellites, cable television, and digital wireless.

10. The method according to claim 6, wherein the voucher comprises a physical object.

11. The method according to claim 10, wherein the physical object is selected from the group consisting of a card, ticket, disk, or receipt.

12. The method according to claim 11, wherein a network location of the line itemized network merchandise or line itemized download-to-own media material objects is recorded on or in the physical object.

13. The method according to claim 6, wherein the voucher comprises an access key.

14. The method according to claim 13, wherein the access key comprises a physical object.

15. The method according to claim 14, wherein the physical object is selected from the group consisting of a card, ticket, disk, or receipt.

16. The method according to claim 6, wherein the vending a voucher at retail point of sale comprises a face to face interaction between two or more persons.

17. The method according to claim 6, wherein the retail point of sale comprises a checkout, kiosk, cashier's station, cash register, self-check out, self-service, or other means of customer interaction within an establishment.

18. The method according to claim 17, wherein the establishment comprises a retail store, convenience store, vending machine, parking lot, hallway, lobby, or other physical place to conduct business.

19. The method according to claim 6, wherein the retail point of sale comprises a means for accepting a payment through an in-person transaction with a customer wherein said payment is designated for the purchase of the line itemized network merchandise or line itemized downloadable media material objects.

20. The method according to claim 6, wherein the retail point of sale comprises a means for accepting a payment through an in-person transaction with a customer wherein said payment is designated for the purchase of a license for the itemized network merchandise.

21. The method according to claim 6, wherein the retail point of sale comprises a means for accepting a payment through an in-person transaction with a customer wherein said payment is designated for the purchase of the voucher.

22. The method according to claim 6, wherein the itemized network merchandise comprises a physical object.

23. The method according to claim 6, wherein the voucher is only redeemable at a network location separate from the retail point of sale.

24. The method according to claim 6, wherein redemption of the voucher allows the purchaser to record the itemized network merchandise.

25. The method according to claim 24, wherein recording the itemized network merchandise comprises recording the itemized network merchandise to a memory device, disk, compact disk, cassette, VHS tape, or other recording media.

26. The method according to claim 6, wherein the vending comprises receiving a payment for the voucher wherein the payment is at least zero.

27. The method according to claim 6, wherein the voucher is a free sample.

* * * * *

UNITED STATES PATENT AND TRADEMARK OFFICE
CERTIFICATE OF CORRECTION

PATENT NO. : 7,636,695 B2
APPLICATION NO. : 11/262855
DATED : December 22, 2009
INVENTOR(S) : James Leonard Driessen It is certified that error appears in the above-identified patent and that said Letters Patent is hereby corrected as shown below:

Column 10, line 9 of claim 1, which reads, "providing customer access to a retail point of sail location;"

should read, "providing customer access to a retail point of sale location;"

Column 10, line 65 of claim 6, which reads, "sail location;"

should read, "sale location;"

Signed and Sealed this

Twenty-sixth Day of October, 2010

David J. Kappos
*Director of the United States Patent and Trademark Office*